United States Patent [19]

Geiger et al.

[11] Patent Number: 5,167,048

[45] Date of Patent: Dec. 1, 1992

[54] CASTER WHEEL RETENTION DEVICE

[75] Inventors: Richard Geiger, Fremont; Robert W. Lishman, La Selva Beach; Scott Dentino, Capitola, all of Calif.

[73] Assignee: Medical Composite Technology, Soquel, Calif.

[21] Appl. No.: 698,146

[22] Filed: May 10, 1991

[51] Int. Cl.[5] ............................................. B60B 33/00
[52] U.S. Cl. ...................................... 16/35 D; 16/38; 16/19
[58] Field of Search ................. 16/35 D, 35 R, 38, 37, 16/44, 39, 19, 32

[56] References Cited

U.S. PATENT DOCUMENTS

| | | | |
|---|---|---|---|
| 2,188,648 | 1/1940 | Bouvier et al. | 16/35 R |
| 2,282,506 | 5/1942 | Wachter | 16/35 D |
| 2,325,895 | 8/1943 | Wallace | 16/35 D |
| 2,512,941 | 6/1950 | Johnson | 16/35 R |
| 2,891,273 | 6/1959 | Hutchinson | 16/38 |
| 3,237,940 | 3/1966 | Johnson | 16/35 R |
| 3,270,367 | 9/1966 | Loos | 16/44 |
| 4,572,533 | 2/1986 | Ellis et al. | 16/44 |
| 4,887,826 | 12/1989 | Kantner | 280/250.1 |

OTHER PUBLICATIONS

Kauzlarich et al., *A Caster Damper Design*, University of Virginia, 1990.

Primary Examiner—Lowell A. Larson
Assistant Examiner—Michael J. McKeon
Attorney, Agent, or Firm—Burns, Doane, Swecker & Mathis

[57] ABSTRACT

A caster retention device is disclosed that supresses flutter or shimmy of a caster wheel and that is easily adjustable. The device includes a caster stem receiving chamber in which a bushing is disposed. The bushing receives a caster stem assembly that includes bearing elements. An adjustable locking device secures the stem assembly within the bushing and is positioned at an opening of the receiving chamber. In one embodiment the device may include first and second collars that are useful for adjusting a preload on the bearings.

10 Claims, 3 Drawing Sheets

CASTER WHEEL RETENTION DEVICE

BACKGROUND OF THE INVENTION

The present invention relates to wheelchair casters. More particularly, the present invention relates to a retention device and a flutter dampening device for a wheelchair caster.

The common wheelchair is typified by a seat structure mounted on a frame that is supported above the ground by a pair of drive wheels and a pair of caster wheels. The drive wheels typically have a large diameter and are mounted on either side of the frame while the caster wheels typically have a small diameter and are mounted on the frame forward of the drive wheels.

To facilitate steering of such wheelchairs, each caster wheel is retained in a structure of the frame that allows the caster wheels to pivot 360 degrees. The retaining structure usually includes several bearing elements that receive a caster wheel stem extending from a fork which, in turn, holds the caster wheel itself.

A problem often encountered with these known wheelchairs is that the steering function of each caster wheel is degraded due to the retention structure being susceptible to contamination. For example, many retention structures are unprotected (or insufficiently protected) from contaminants introduced into the bearing elements when a user remains in the wheelchair during showering. After repeated exposure to the contaminants, the bearing elements begin to prematurely wear and thus deteriorate the free pivoting movement of the caster wheels.

An example of one such hub structure can be found in the wheelchair disclosed in U.S. Pat. No. 4,887,826 wherein a caster wheel stem is received within hubs 114, 116 and is allowed to pivot by bushings 123. One can see that contaminants are easily introduced into the bushings 123 through the opening facing upward in hub part 114.

Another problem is encountered with these known wheelchairs when the user only has one hand available for making adjustments to the caster wheels. For example, when tightening of the roller elements is needed to remove clearance caused by extended use of the wheelchair, many known caster wheel retention device designs require more than one hand to effect appropriate adjustment. Consequently, the user may actually be precluded from making necessary adjustments or must, at the least, enlist the aid of a second individual.

A further known problem among the caster wheel designs of prior art wheelchairs is the problem of caster wheel flutter or shimmy. Such flutter or shimmy is a self-excited vibration which occurs above a critical speed of the wheelchair and can cause a drag from the effected wheel that is so high that the wheelchair may be forced to one side or may even be turned over.

Attempts have been made to alleviate flutter in caster wheels of a wheelchair as evidenced by the publication "A Caster Shimmy Damper Design" by Kauzlarich, et. al.

The device in the Kauzlarich, et. al. design incorporates a spring-washer shimmy damper which places a washer in frictional contact with an outer race of one of the bearings in the caster wheel retention device. The frictional contact is maintained by means of a spring such that the shimmy phenomena is substantially suppressed. However, the Kauzlarich, et. al. device is not adjustable. Hence, if it is determined that a greater spring force is needed to adequately suppress the shimmy or if extended use has degraded the ability of the spring to provide suitable suppression, disassembly of the Kauzlarich et. al. device is required in order to replace or adjust the spring.

OBJECTS AND SUMMARY OF THE INVENTION

It is an object of the present invention to provide a wheelchair caster retention device that overcomes the above-described deficiencies and disadvantages associated with prior art wheelchairs.

It is an object of the present invention to provide a wheelchair caster retention device that substantially protects moving elements of the retention device from contamination.

It is an object of the present invention to provide a wheelchair caster retention device that is easily adjustable by a user having the use of only one hand.

It is an object of the present invention to provide a wheelchair caster retention device that adjustably suppresses caster shimmy or flutter.

It is an object of the present invention to provide a wheelchair caster retention device that suppresses caster shimmy or flutter and is also adjustable.

These and other objects not specifically enumerated here are achieved by a caster retention device for a wheelchair caster in accordance with the present invention.

BRIEF DESCRIPTION OF THE DRAWINGS

Preferred embodiments of the present invention will be described in detail with reference to the accompanying drawings, wherein like members bear like reference numerals and wherein.

DETAILED DESCRIPTION

Figure 1:
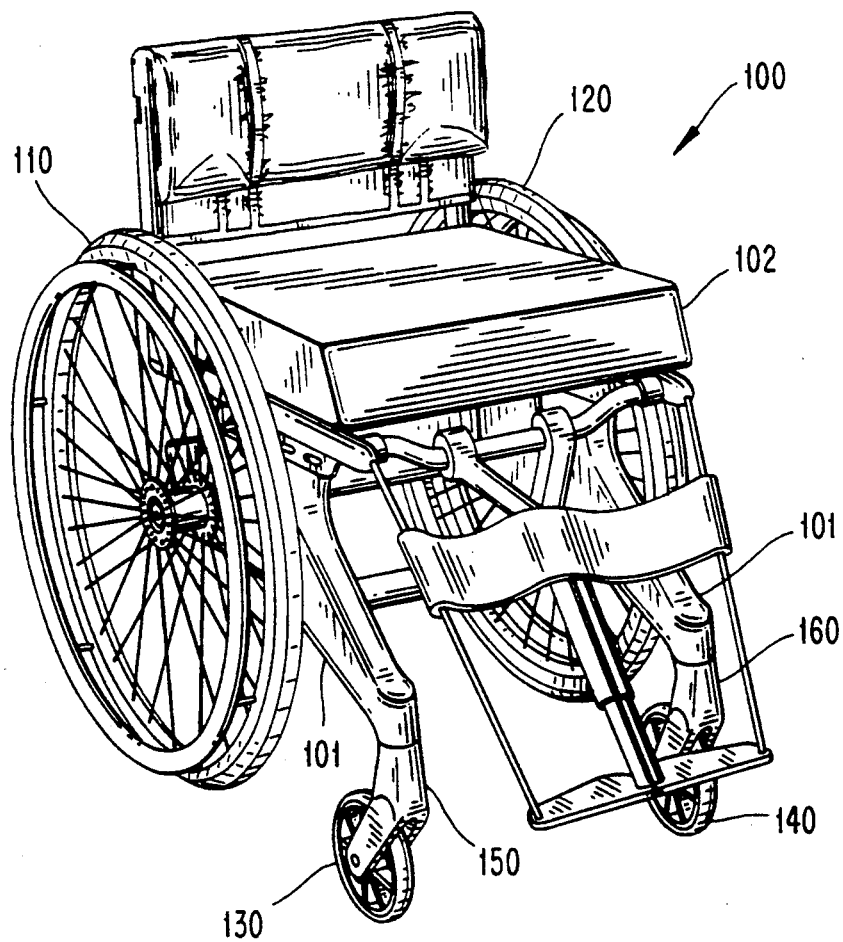
FIG. 1 is a perspective view of a wheelchair having a caster retention device in accordance with the present invention.

A wheelchair 100 is shown in FIG. 1 that includes a seat assembly 102 that is mounted on a wheelchair chassis 101. A pair of drive wheels 110, 120 are fixed to opposite sides of the chassis 101 and a pair of caster wheels 130, 140 are attached to the chassis 101 forward of the drive wheels 110, 120. The pair of caster wheels, 130, 140 are attached to the chassis 101 by means of caster forks, 150, 160, respectively.

Figure 2:
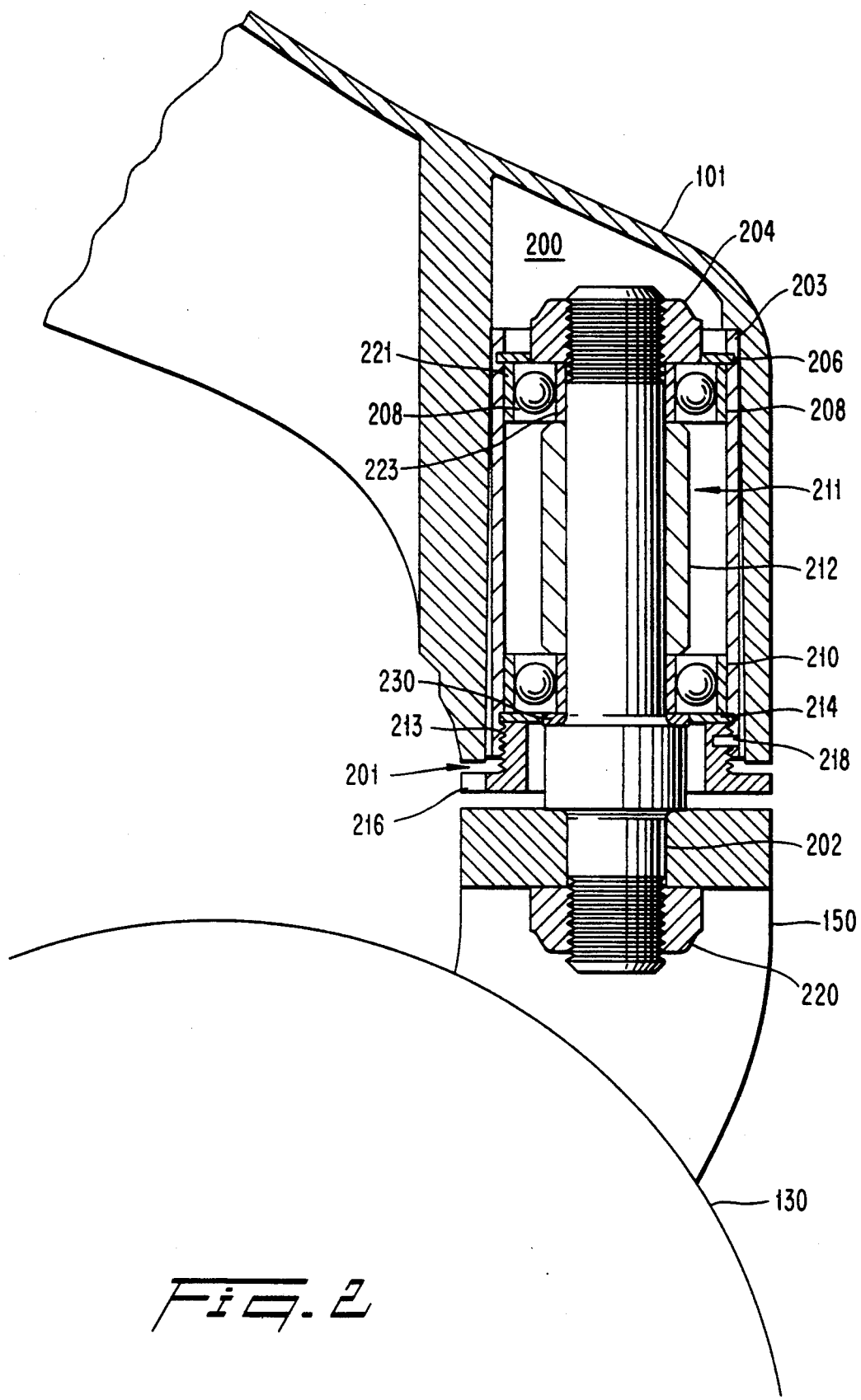
FIG. 2 is a cross-sectional view of a first embodiment of a caster retention device in accordance with the present invention.
Figure 3:
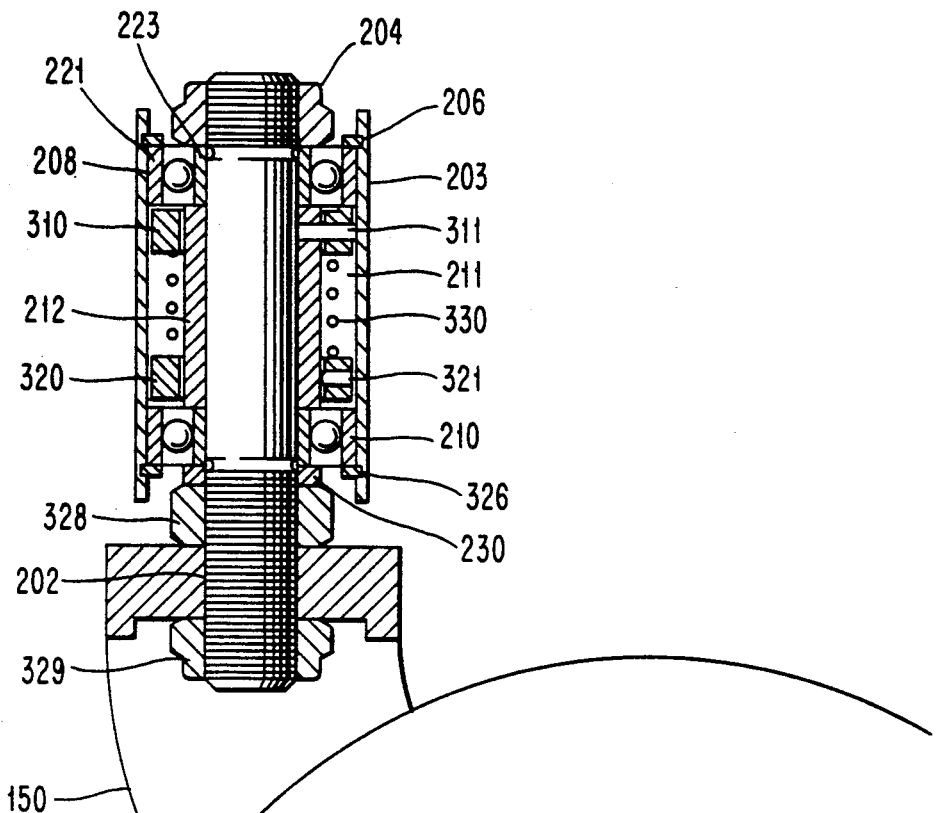
FIG. 3 is a cross-sectional view of a second embodiment of a caster retention device in accordance with the present invention.

FIGS. 2 and 3 depict embodiments of the caster retention device in accordance with the present invention with regard to only the right caster wheel. However, the retention device for the left caster wheel of each embodiment is identically configured.

Referring to FIG. 2, the chassis 101 of the wheelchair 100 includes a chamber 200 for receiving a caster stem assembly 211. The frame is molded from composite material, hence, the chamber is a molded-in feature of the chassis. The chassis 101 could also be a metallic cast, forged or stamped item. The chamber 200 has only one single opening 201 and that opening 201 is faced downwardly during normal use of the wheelchair. Consequently, contaminants are prevented from being introduced to the caster stem assembly 211 from the top of the chamber 200.

Within the chamber 200 is a bushing 203 which includes threads at the end of the bushing nearest the opening 201 of the chamber 200. At an opposite end of the bushing 203 is a retention ring 206 which provides a stop for correct positioning of the caster stem assembly 211 within the bushing 203.

The caster stem assembly 211 includes a stem 202 that is connected to the fork 150 of the caster wheel 130 by a lock nut 220 that engages threads on the lower portion of the stem 202. Upper and lower ball bearings 208, 210 are mounted opposite each other along the stem, 202 and are separated from each other by a bearing spacer 212.

Each bearing 208, 210 has an inner race 223 and an outer race 221 and the bearing spacer 212 separates the upper and lower bearings 208, 210 between the inner races 223 of each bearing 208, 210. The upper bearing 208 is secured on the stem 202 between the bearing spacer 212 and a lock nut 204 that engages threads on the upper portion of the stem 202. The lower bearing 210 is secured on the stem 202 between the bearing spacer 212 on one side and a wave-type spring washer 214, a washer spacer 230 and a lock ring 216 on an opposite side.

The lock ring 216 is threaded so as to engage the threads 213 of the bushing 203 and thereby secure the caster stem assembly 211 within the bushing 203 through the spring washer 214. The spring washer 214 serves to preload the bearings 208, 210 and thus increase stiffness of the retention device. On the periphery of the threads 213 is a nylon insert that serves to secure the lock ring 216 in place when engaged with threads 213 of the bushing 203.

As mounted, the lock ring 216 urges the spring washer 214 to preload the lower bearing 210 which, through the bearing spacer 212, preloads the upper bearing 208 against the retention ring 206. The presence of the spring washer 214 (and the resulting force therefrom) adds to the stiffness of the assembly 211 such that flutter of the caster wheel 130 is substantially suppressed.

If it is desired to increase the preload of the spring washer 214 on the bearings 208, 210 or to effect other adjustments of the caster retention device, only a single tool is needed to adjust or remove the lock ring 216. Consequently, those users having only one hand available to effect such adjustment can make such changes without enlisting aid from others.

Referring to FIG. 3, a second embodiment of a caster retention device in accordance with the present invention may include upper and lower collars 310, 320 separated by a spring 330 for providing flutter dampening to the caster 130. The upper collar 310 is keyed to the bearing spacer 212 by a key pin 311 so that the upper collar 310 rotates along with the stem 202 while still allowing movement of the collar 310 along the axis of the stem 202. The lower collar 320 is movable along the axis of the stem 202 and secured in a desired location along the stem 202 by a set screw 321.

As compressed between the two collars 310, 320, the spring 330 urges the upper collar 310 into frictional contact with the outer race 221 of the upper bearing 208. The frictional contact between these two elements serves to suppress the flutter or shimmy that may occur in caster wheel 130 at a certain speed of the wheelchair 100. If the spring force from the spring 330 must be adjusted, the lower collar 320 can be moved to a different position along the stem 202 and the set screw 321 retightened. In this manner, the desired flutter suppression can still be achieved despite such things as undesirable clearance due to bearing wear.

In the second embodiment of the present invention, the caster stem assembly 211 is retained in the bushing 203 by a pair of retention rings 206, 326. Furthermore, the stem 202 is connected to the fork 150 by a pair of lock nuts 328, 329 screwed on a threaded portion of the stem 202.

In a preferred embodiment, the chassis 101 having the chamber 200 is molded out of a composite material while the bushing is made from stainless steel.

In the second embodiment of the invention as disclosed in FIG. 3, the collar 311 may be made from brass.

One of ordinary skill in the art will appreciate that the various parts of the disclosed embodiments can be made from any of numerous suitable materials.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, may be embraced thereby.

We claim:

1. A caster retention device for a wheelchair caster comprising:
    caster stem receiving chamber of a wheelchair chassis, said chamber having a single opening facing downwardly during normal use of a wheelchair;
    a stem assembly having a caster stem upon which a pair of bearing elements are mounted, said pair of bearing elements being ball bearings having inner and outer races, said bearing elements being separated along said stem by a bearing spacer contacting the inner races of each of said pair of bearings;
    busing means for receiving said stem assembly, said busing means being disposed within said receiving chamber and extending substantially the length of said receiving chamber such that substantially all of said caster stem is receivable within said receiving chamber;
    a retention ring disposed at an upper end region of said bushing means, an outer race of an upper ball bearing of said pair of ball bearings positioned to abut against said retention ring and thus retain said stem assembly at a predetermined location in said receiving chamber; and,
    adjustable locking means for securing said stem assembly within said bushing means at said single opening of said receiving chamber, said locking means engaging an outer race of a lower ball bearing of said pair of ball bearings.

2. A caster retention device according to claim 1, further comprising spring means for preloading said pair of bearing elements, said spring means being compressible against said bearing elements by said means for securing.

3. A caster retention device according to claim 2, wherein said spring means for preloading is a wave washer disposed between one of said bearing elements and said means for securing.

4. A caster retention device according to claim 1, wherein said locking means is a threaded element and said bushing means includes threads for engaging said threaded elements.

5. A caster retention device according to claim 4, wherein said threaded element includes a nylon insert disposed on the periphery of said threads for locking said threaded element to said bushing means.

6. A caster retention device according to claim 4, wherein said locking means includes thread engagable with threads of said bushing means such that the preload of said pair of bearings by said spring means is adjusted according to the degree of threaded engagement of said locking means with said bushing means.

7. A caster retention device according to claim 6, wherein said spring means is a wave spring disposed between said locking means and one of said pair of bearings.

8. A flutter dampening device for a caster of a wheelchair comprising:
- a caster stem;
- an upper bearing and a lower bearing mounted on said stem, each of said upper and lower bearings having an inner and an outer race, said upper and lower bearings being separated from each other along said stem by a bearing spacer disposed between the inner races of said upper and lower bearings; said spacer being rotatable along with said stem and said inner races;
- a first collar fixed to said spacer and positioned in frictional contact with the outer race of one of said upper and lower bearings;
- a second collar fixed to said spacer opposite said first collar, said second collar being axially adjustable along said caster stem;
- spring means for maintaining said first collar in frictional contact with said outer race with a desired force, said spring means being disposed between said first and second collars such that said desired force is adjustable according to axial positioning of said second collar.

9. A flutter dampening device according to claim 8, wherein said first collar is a brass collar.

10. A flutter dampening device according to claim 8, further comprising set screw means for securing said second collar at a desired location along the axis of said stem.

* * * * *